United States Patent [19]
Perkins

[11] Patent Number: 4,964,316
[45] Date of Patent: Oct. 23, 1990

[54] INFINITELY VARIABLE TRANSMISSION
[76] Inventor: Frank M. Perkins, 257 Avenida Atezada, Redondo Beach, Calif. 90277
[21] Appl. No.: 636,985
[22] Filed: Aug. 2, 1984
[51] Int. Cl.$^5$ ........................ F16H 37/06; F16H 15/26
[52] U.S. Cl. ...................................... 475/215; 74/198; 475/217
[58] Field of Search .......................... 74/690, 691, 198

[56] References Cited
U.S. PATENT DOCUMENTS
4,392,395  7/1983  Clarke ................................. 74/690

FOREIGN PATENT DOCUMENTS

| | | | |
|---|---|---|---|
| 2422789 | 12/1974 | Fed. Rep. of Germany | 74/198 |
| 23916 | 9/1921 | France | 74/690 |
| 842417 | 6/1939 | France | 74/691 |
| 1102693 | 10/1955 | France | 74/691 |
| 1108955 | 1/1956 | France | 74/198 |
| 1364807 | 12/1964 | France | 74/691 |
| 438750 | 8/1948 | Italy | 74/198 |
| 206059 | 11/1923 | United Kingdom | 74/690 |

Primary Examiner—Dirk Wright

[57] ABSTRACT

A mechanical clutch free transmission in which a power input shaft concurrently rotates a rigid sphere and a first gear of a differential, which differential has a second gear. A circumferentially extending sequence of rollers are supported in frictional contact with the sphere by a power transmitting ring that rotates within a tilt ring that may be selectively pivoted about an axis that is normal to the axis of rotation of the sphere. The power transmitting ring has a ring gear secured thereto that by a gear train rotates the second gear of the differential. The first and second gears of the differential engage a pair of idling gears supported on a cross piece connected to the power output shaft of the transmission. When the tilt ring is normal to the axis of rotation of the sphere the sequence of rollers rotate at the same rate as the sphere and the power output shaft rotates at a maximum rate in a positive direction relative to the rate of rotation of the power input. As the control shaft is used to pivot the tilt ring towards the axis of rotation of the sphere the rate of rotation of the power transmitting ring decreases as does that of the second gear relative to the first gear, with the rate of rotation of the power output shaft in a positive direction decreasing, then becoming stationary, and then starting to increase in a negative direction.

15 Claims, 3 Drawing Sheets

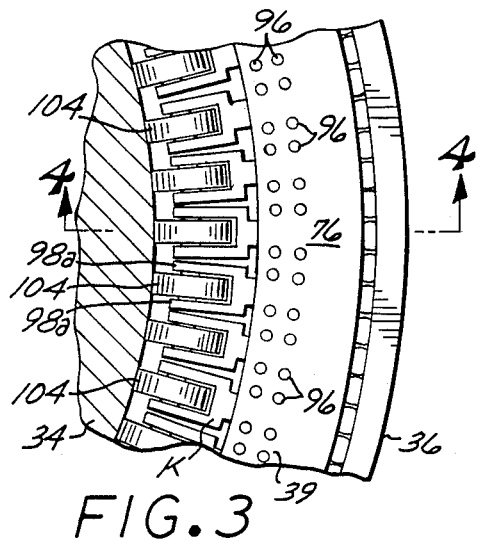
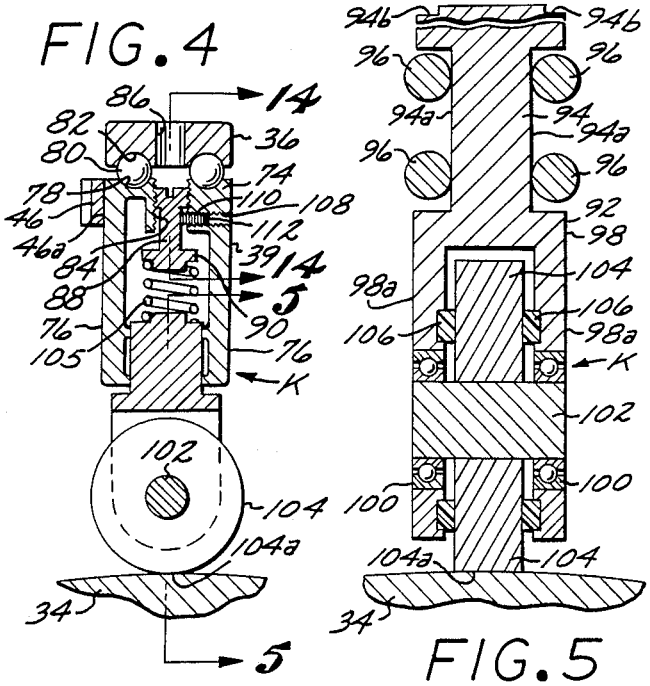
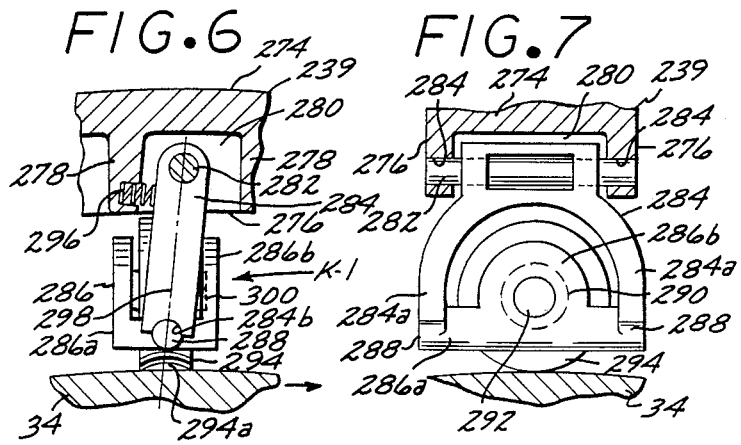
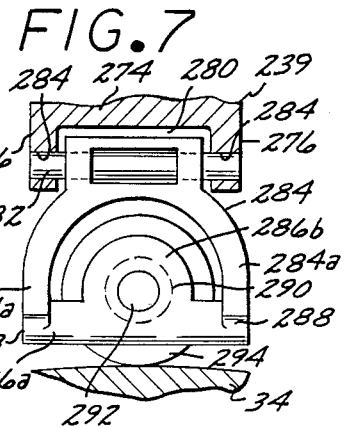
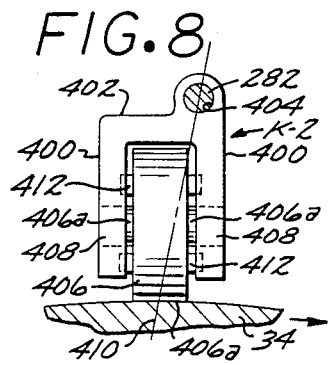
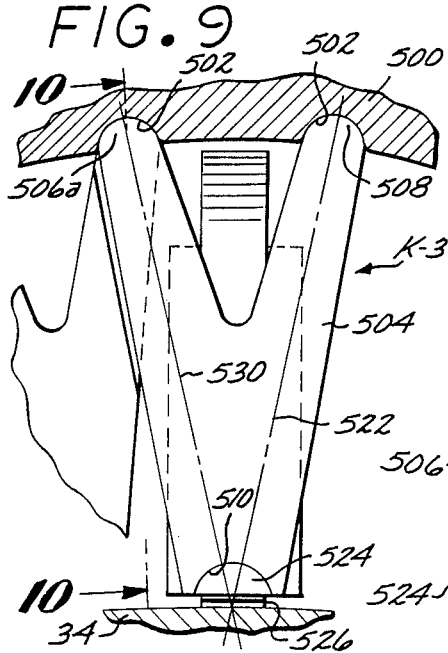
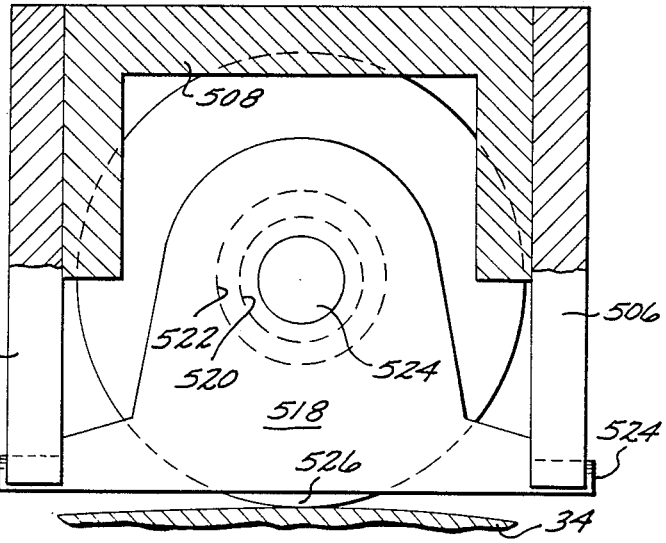

INFINITELY VARIABLE TRANSMISSION

DESCRIPTION OF THE PRIOR ART

In the past, various types of transmission, both mechanical and hydraulic have been developed and used that include a clutch mechanism. Such prior art devices are of a complicated structure, and require careful maintenance to remain in a satisfactory operating condition.

A major object of the present invention is to provide a mechanical clutch free transmission that has a relatively simple structure, requires a minimum of maintenance attention, and by pivotal movement of a control shaft the power output shaft of the transmission may be caused to rotate from a maximum rate in a positive direction, to a stationary position, and then to rotate in a negative direction at an increased rate, which sequence can of course be reversed. The positive direction would correspond to forward motion when the transmission is used in an automotive vehicle, the stationary position would correspond to neutral, and the negative direction to reverse movement of the vehicle.

SUMMARY OF THE INVENTION

A transmission that includes a housing that has a power input shaft extending thereinto to rotate first and second gears, the first gear being in engagement with a third gear rigidly secured to a power transmitting shaft on which a rigid sphere is mounted, and the second gear being a part of a differential. A control shaft pivotally supports a tilt ring within the housing and in an encircling position about the sphere. A power transmitting ring is rotatably supported within the tilt ring and has a ring gear secured to one side thereof. The power transmitting ring serves as a mounting for a sequence of roller assemblies that are disposed side by side and extend as a great circle about the sphere. The rollers of the roller assemblies are in frictional contact with the exterior surface of the sphere, with the axis of rotation of the rollers being parallel to a flat circumferential side of the power transmitting ring, and the rollers due to frictional contact with the sphere driving the power transmitting ring.

The rotary motion of the ring gear is transmitted to a fourth gear that rotates a fifth gear that is a part of a gear train that includes sixth, seventh and eighth gears. The eighth gear is secured to a ninth gear that is a part of the differential, which differential includes a pair of idling gears rotatably supported on a cross bar from which the power output shaft of the transmission extends. The idling gears are in toothed engagement with the second and ninth gears.

Each of the roller assemblies is driven by frictional contact with the sphere at the same rate. The sequence of roller assemblies rotate at the same rate as the sphere when the great circle that the sequence of roller assemblies define is normal to the axis of rotation of the sphere, and the power output shaft rotates at a maximum rate in a positive direction relative to the power input shaft.

When the control shaft is pivoted to move the tilt ring towards the axis of rotation of the sphere the rate of rotation of the ring gear starts to decrease with a consequent reduction in the rate of rotation of the ninth gear. As the rate of rotation of the ninth gear decreased relative to the second gear the rate of rotation of the power output shaft in a positive direction decreases. Further pivoting of the control shaft results in the ninth gear so rotating relative to the second gear that the power output shaft is stationary. Additional pivotal movement of the control rod results in the ninth gear so rotating relative to the second gear that the driven shaft starts to rotate in a negative direction and the rate of rotation in the negative direction increasing as the control rod continues to be pivoted towards the axis of rotation of the sphere.

From the above description it will be seen that a transmission is provided that by pivotal movement of a single control rod and without the use of a clutch, a power output shaft may be rotated positively or negatively at a desired rate or maintained in a stationary position, with the transition of the rotation of the power output shaft from the positive or negative direction being accomplished smoothly and without jerking.

BRIEF DESCRIPTION OF THE DRAWINGS

FIG. 3 is a fragmentary end elevational view of the transmission taken on the line 3—3 of FIG. 2;

FIG. 4 is a transverse cross sectional view of the transmission taken on the line 4—4 of FIG. 3 and illustrating a first form of roller assembly;

FIG. 5 is a longitudinal cross sectional view of the first form of roller assembly taken on the line 5—5 of FIG. 4;

FIG. 6 is an end elevational view of a second form of roller assembly;

FIG. 7 is a side elevational view of the second form of roller assembly;

FIG. 8 is an end elevational view of a third form of roller assembly;

FIG. 9 is an end elevational view of a fourth form of roller assembly;

FIG. 10 is a side elevational view of a fourth form of roller assembly;

DESCRIPTION OF THE PREFERRED EMBODIMENT

Figure 2:
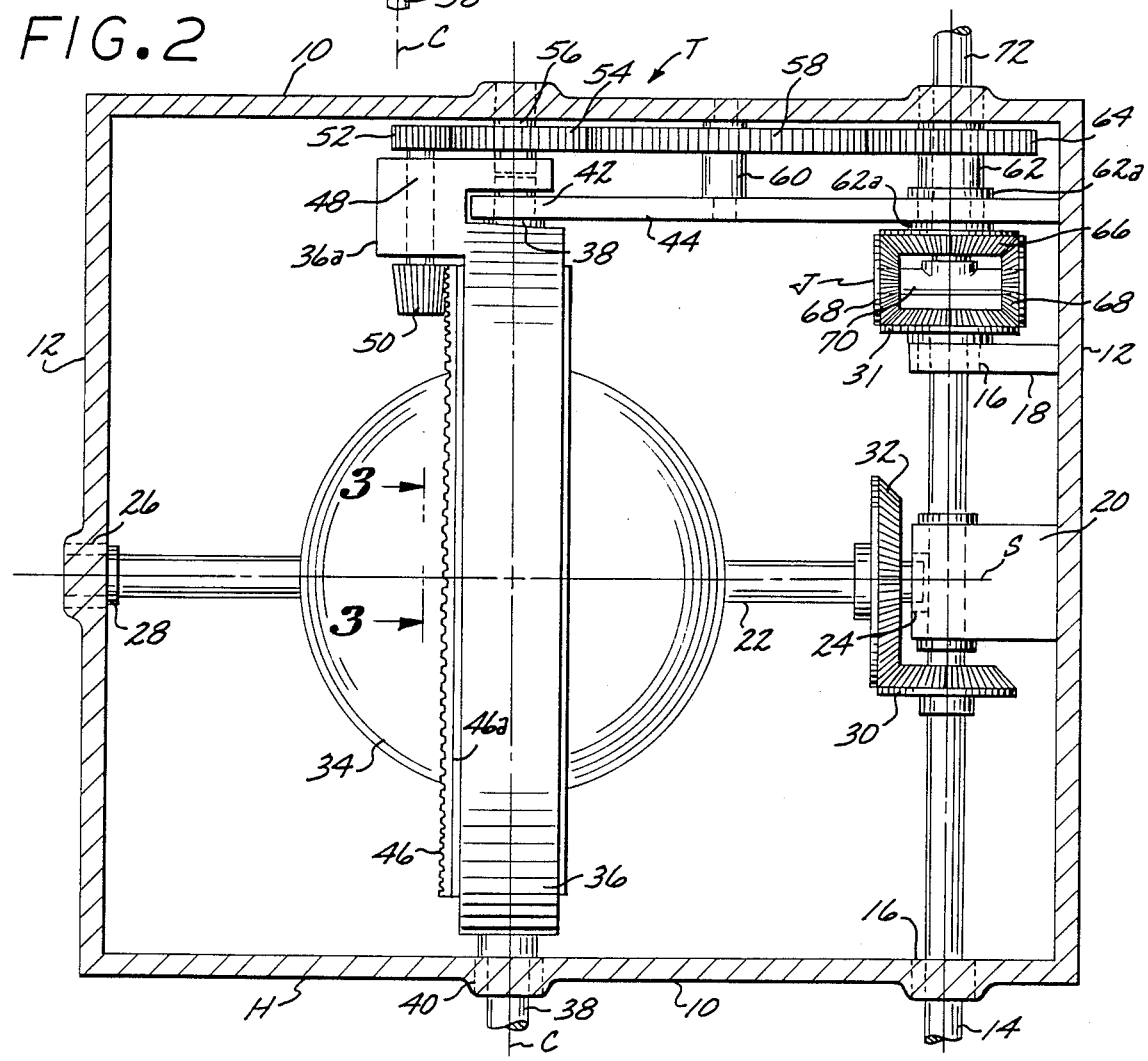
FIG. 2 is a top plan view of the transmission.

The transmission T as shown in FIG. 2 includes a housing H that has a pair of side pieces 10 and end pieces 12. A power input shaft 14 is journaled in a pair of bearings 16 supported in one of the side pieces 10 and a bracket 18 that extends into the housing from one of the end pieces 12.

The input shaft 14 extends through an opening in a second bracket 20, which second bracket extends into housing H from one of the end pieces 12. A power transmitting shaft 22 having an axis of rotation S is rotatably supported by bearings 24 and 26 mounted in the second bracket 20 and one of the end pieces 12, as shown in FIG. 2. A collar 28 on shaft 22 in cooperation with bearing 24 prevent the shaft from moving longitudinally relative to housing H.

Power input shaft 14 has a first gear 30 mounted thereon that is in toothed engagement with a second gear 32 secured to power transmitting shaft 22. Power input shaft 14 on the inner end thereof has a third gear 31 secured thereto which is a part of a differential J that is illustrated in FIG. 2 as being within housing H. Differential J is not limited to the design shown, but may be any appropriate one of such commercially available units that include planetary and other designs.

A rigid sphere 34 is mounted on power transmitting shaft 22 as may be seen in FIG. 2. A tilt ring 36 is disposed in an encircling position about sphere 34 and has two diametrically aligned control shaft portions 38 extending outwardly therefrom that are rotatably supported by a bearing 40 in an elongate third bracket 44 that extends into housing H from one of the end pieces 12.

The control shaft portions 38 pivot on an axis of rotation C that is normal to the axis S. The control shaft 38 may be pivoted by conventional means (not shown) such as a handle, or mini-computer controlled servo mechanism to maintain an optimum output to input transmission velocity ratio. The tilt ring 36 rotatably supports a power transmitting ring 39 that serves as a mounting for a number of circumferentially spaced roller assemblies K as may be seen in FIG. 3.

The power transmitting ring 39 has a power transmitting ring gear 46 secured to one side thereof as shown in FIG. 2. The tilt ring 36 has a U-shaped extension 36a projecting therefrom. A free end portion of third bracket 44 is situated within extension 36a. The extension 36a rotatably supports a transverse shaft 48 that has fourth and fifth gears 50 and 52 secured to the ends thereof as shown in FIG. 2.

A sixth gear 54 is in toothed engagement with the fifth gear 52 and is rotatably supported by a shaft 56 that has the end portions journaled in extension 36a and the side piece 10 adjacent thereto as shown in FIG. 2. The sixth gear 54 is in toothed engagement with a seventh gear 58 that is rotatably supported by a shaft 60 that has the end portions thereof mounted in third bracket 44 and the side piece 10 most adjacent thereto.

A tubular shaft 62 is journaled in the third bracket 44 and the side piece 10 most adjacent thereto, and is held in a fixed position relative to the third bracket by outwardly projecting rings 62a. Shaft 62 on one end portion has an eighth gear 64 secured thereto that is in toothed engagement with seventh gear 58. Shaft 62 on the opposite end has a ninth gear 66 secured thereto that is a part of differential J, as may be seen in FIG. 2. The third and ninth gears 31 and 66 are in toothed engagement with a pair of idling rollers 68 that are rotatably mounted on a cross bar 70, and from which a power output shaft 72 of the transmission H extends outwardly through a bore in the tubular shaft 62.

A first form K of the roller assemblies is shown in FIGS. 3, 4, 5 and 14. The force transmitting ring 39 is of channel shaped transverse cross section and includes a web 74 from which a pair of laterally spaced side flanges 76 extend inwardly towards the sphere 34 as may be seen in FIG. 4. The web 74 on the external surface has a pair of first grooves 78 defined therein that engage balls 80 that are in engagement with second grooves 82 defined on the interior surface of the tilt ring 36. The balls 80 serve to rotatably support the force transmitting ring 39 within tilt ring 36.

The force transmitting ring 39 has a number of circumferentially spaced, radially extending, tapped bores 84 defined therein that may be aligned with a number of bores 86 formed in the tilt ring 36 for reasons that will later be explained. Bores 84 and 86 are best seen in FIG. 4. Each of the tapped bores 84 is engaged by a screw 88 that has a force exerting plate 90 on the inner end thereof.

Each roller assembly K includes a roller mount 92 that has an outer portion 94 that has flat oppositely disposed side surfaces 94a and an upper force receiving end 94b. Each outer portion 94 is held in a fixed radially extending position in the force transmitting ring 39 and in alignment with one of the tapped bores 84 by two pairs of rollers 96, best seen in FIG. 5, which rollers have the end portions thereof journaled in the pair of flanges 76.

The inner portion 98 of each roller mount includes a pair of spaced legs 98a that support a pair of transversely aligned bearings 100. Each pair of bearings 100 rotatably support a shaft 102 that has a roller 104 secured thereto, which roller extends outwardly from the legs a substantial distance. Each roller 104 has a flat circumferential surface 104a that frictionally contacts the surface of the sphere 34.

Each roller 104 is defined by a material that has a high coefficient of friction when in pressure contact with the surface of sphere 34, which sphere is preferably formed from a metal such as steel. The rollers 104 are preferably formed from rubber or one of the numerous synthetic plastics having rubber like physical characteristics. Each pair of legs 98a includes a pair of thrust bearings 106 disposed on opposite sides of the roller 104 disposed between the pair of legs. A helical spring 105 is provided for each roller assembly and is disposed between the force transmitting plate 90 and the force receiving end 94b of the outer portion 94.

When each screw 88 is rotated in a direction to move the force transmitting plate 90 inwardly, the compression on spring 105 is increased, and the force urging the roller 104 operatively associated with the spring inwardly is increased. By aligning the bores 86 of the tilt ring with the screws 88, the screws 88 may be engaged by a screw driver (not shown) and sequentially rotated to place a desired inwardly directed force on the rollers 104 to force them into pressure contact with sphere 34.

Each web has a transverse tapped bore 108 therein in which a plunger 110 is disposed that may be moved inwardly to pressure contact screw 88 when a set screw 112 that is mounted in the tapped bore is rotated in an appropriate direction. Pressure contact of each plunger 110 with a screw 88 must be sufficient to prevent the screw from rotating when the force transmitting ring 39 is driven. Inadvertent rotation of the screws 88 would result in different pressure being exerted by different rollers 104 on the sphere 34, and the rollers being subjected to different side loads as the sphere 34 rotates.

The roller assemblies K are so supported in the power transmitting ring 39 that the shafts 102 that rotatably support the rollers 104 are parallel to a flat side surface 46a of power transmitting ring gear 46. When the tilt ring 36 is pivoted by use of control shaft 38 to a position where it is normal to the shaft 22, the roller assemblies K due to frictional pressure contact with the sphere 34 rotate the power transmitting ring 39 at substantially the same rate as the sphere. This rate of rotation is transmitted by the power transmitting ring gear 46 to gear 50 and then through gears 52, 54, 58, 64 to gear 66 of the differential. The gears 31 and 66 of the differential rotate at a maximum rate in opposite directions and the power output shaft 72 rotates at a maximum rate relative to the rate of rotation of the input shaft 14.

Assume that the power input shaft 14 continues to rotate at a constant rate and the tilt ring 36 is pivoted by control rod 38 towards the axis of rotation S of the sphere 34. The roller assemblies K now drive the power transmitting ring 39 and power transmitting ring gear 46 at a lesser rate, and the rate of rotation of gear 66 relative to gear 31 in differential J decreases. This decrease results in the power output shaft 72 having its rate of rotation decrease in a positive direction. Further pivoting of the tilt ring 36 by control shaft 38 will result in such relative movement between gears 31 and 66 of differential J that the power output shaft 72 becomes stationary.

Further pivoting of tilt ring 36 by control shaft 38 after power output shaft becomes stationary results in such relative rotation of gears 31 and 66 of differential J that the power output shaft 72 starts to rotate in a negative direction, or in a direction opposite to that in which it initially rotated. Further pivoting of the tilt ring 36 results in an increase in the rate of rotation of the power output shaft in a negative direction. The sequence above described is reversed when the tilt ring 36 is pivoted towards the position shown in FIG. 2 where it is normal to the axis of rotation S of sphere 34.

As will later be demonstrated the transmission T is highly effecient, as the sphere 34 tends to drive all of the roller assemblies K in a circumferential path at the same speed, and there is no longitudinal slippage between the rollers 104 and the sphere 34. Since all of the roller assemblies K are driven by the sphere 34 at the same speed, the output torque of the transmission through the power output shaft 72 is equal between the rollers 104 of the assemblies K.

Figure 13:
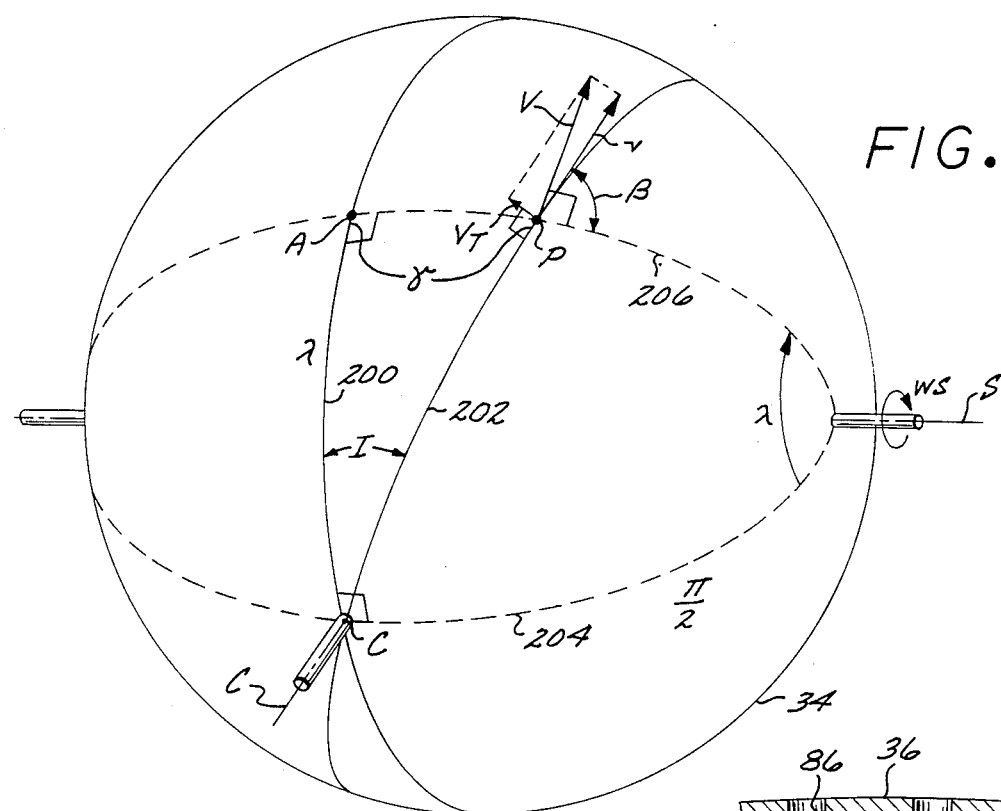
FIG. 13 is a diagrammatic view of the sphere and force components.

In FIG. 13 it will be seen that the great circle 200 that is normal to the axis of rotation S defines the positions of the rollers 104 relative to the sphere 34 when the tilt ring is in the position shown in FIG. 2. The following is the mathematical proof that the velocity imparted by the sphere 34 to each roller assembly K is the same regardless of the rotational position of each roller assembly within the tilt ring 36. It will also be shown that the angular velocity of the power transmitting ring 39 in rotating upon its axis is equal to the product of the angular input velocity of the sphere rotating on axis S and the cosine of the tilt angle I which is the angle between great circles 200 and 202 shown in FIG. 13, both of which pass through axis C. Great circle 200 may be regarded as the equator of the sphere 34 that rotates on the axis S. The roller assemblies K and the power transmitting ring 39 on which they are mounted are rotated on a path which is the great circle 202 by the sphere 34, due to the power transmitting ring being confined to rotate within the tilt ring 36. The point P is the center of the area of pressure contact of any one of the rollers 104 with sphere 34.

The location of point P may be designated by the angle λ suspended by the meridians 204 and 206 from axis S to C and from axis S to P. The meridians 204 and 206 intersect the great circle or equator 200 to form right angles as shown at C and A. The latitude of point P is the polar angle γ or the length of arc AP in units of spherical radius.

This analysis is valid regardless of the direction of rotation of sphere 34. It is assumed that the point P will move momentarily with velocity vector V as shown in FIG. 13. This velocity is along the parallel of latitude passing through P and is normal to SP as shown in FIG. 13. The component of V that is directed along the great circle path 202 is indicated in FIG. 13 by lower case V and acts at point P. As is shown in FIG. 13 v is V multiplied by the cosine of $$\left(\frac{\pi}{2} - \beta\right)$$

which is the angle between the two vectors V and v.
Then, $$v = V \sin \beta \quad \text{Equation (1)}$$

The velocity V is the product of the rotational velocity $\omega_s$ of sphere 34 which is $d\lambda/dt$, and the distance of P from the polar axis passing through S, $$V = R\omega_s \cos \gamma \quad (2)$$

By trigonometric definition $$\sin\beta = \sqrt{1 - \cos^2\beta} \quad (3)$$

Substituting the left sides of equations (2) and (3) into equation (1) yields:

$$v = R\omega_s \cos\gamma \sqrt{1 - \cos^2\beta} \quad (4)$$

The next step is to find equations for γ and β to substitute into equation (4)

The spherical trigonometric cosine law applied to the triangle CSP yields $$\cos\beta = +\sin I \cos\lambda \quad (5)$$

Napiers rule applied to the spherical right triangle CAP yields:

$$\tan\gamma = \tan I \sin\lambda \quad (6)$$

By trigonometric definition $$\cos\gamma = \frac{1}{\sqrt{1 + \tan^2\gamma}} \quad (7)$$

Substituting of equation (6) into (7) and the result into equation (4), along with the substitution of equation (5) into equation (4) yields the following:

$$v = R\omega_s \sqrt{\frac{1 - \sin^2 I \cos^2\lambda}{1 + \tan^2 I \sin^2\lambda}} \quad (8)$$

The sine squared plus cosine squared of any angle equals unity. Thus, the radical expression within equation (8) is equal to the cosine of I, reducing equation (8) to:

$$v = R\omega_s \cos I \quad (9)$$

By definition the angular velocity $W_R$ (not shown) of force transmitting ring 39 is equal to its tangential velocity v divided by its radius R (not shown). Dividing equation (9) by R then yields the final result $$\omega_R = \omega_S \cos I \tag{10}$$

It should be noted that the term λ designating the point P on the great circle 202 has disappeared. This has the two important consequences previously mentioned and that make the invention practical, namely:

1. The sphere 34 drives all of the rollers 104 longitudinally relative to their shafts 102 at the same rate so there is no longitudinal slippage between the rollers and sphere 34.

2. Since all rollers 104 are driven longitudinally at the same speed, the output torque loading of shaft 72 shown in FIG. 2 is equally divided among all of the rollers 104.

The use and operation of the transmission T is extremely simple. The power input shaft 14 is driven by a prime mover (not shown). The power input shaft 14 concurrently rotates first and third gears 30 and 31, with the first gear driving a second gear 32 that is secured to the power transmission shaft S on which the sphere 34 is mounted.

Figure 1:
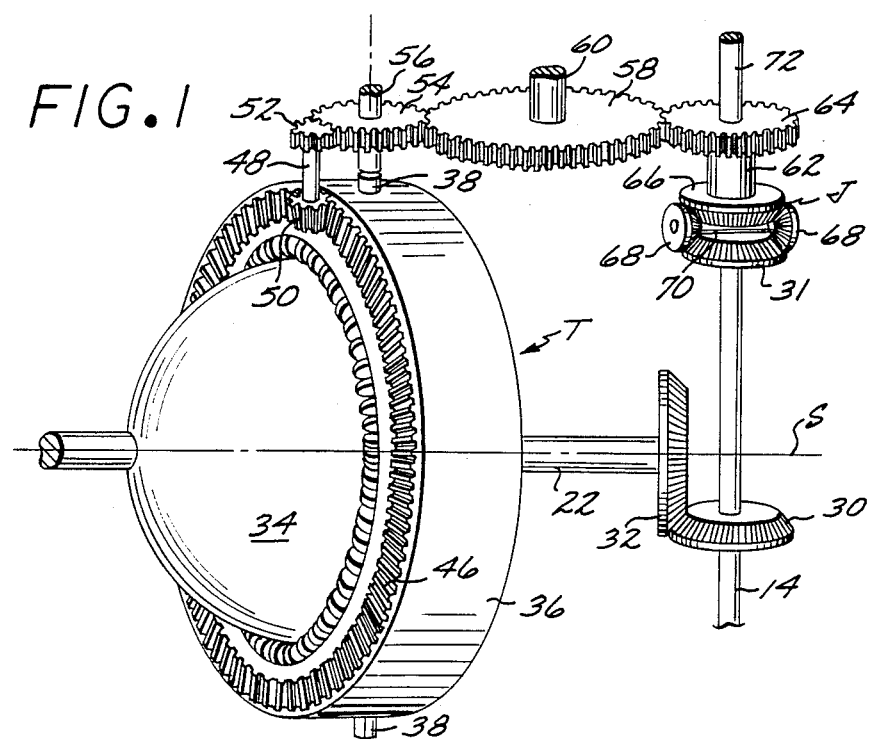
FIG. 1 is a diagrammatic view of the transmission.

The tilt ring 36 may be pivoted by conventional means (not shown) on the axis C illustrated in FIG. 1, which axis is normal to the axis S. The tilt ring encircles the sphere 34 and rotatably supports the power transmitting ring 39 that serves as a mounting for the roller assemblies K. Each of the assemblies K has a roller 104 that frictionally engages the sphere 34, with rotational motion of the sphere being transferred by the roller assemblies to the power transmitting ring 39. Rotary motion of the ring 39 is transferred to a power transmitting ring gear 46 that drives a sequence of gears 50, 52, 54, 58, 64 and 66, the last of which is a part of a differential J, as shown in FIG. 2. The differential gears 31 and 66 engage idling rollers 68 mounted on opposite ends of a cross bar 70 from which the power output shaft 72 extends.

Figure 14:
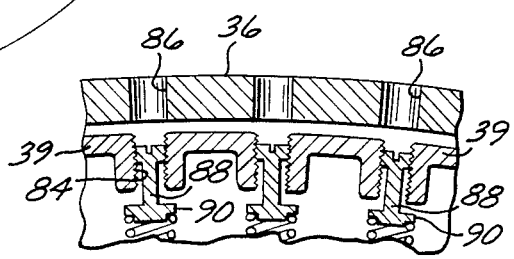
FIG. 14 is a longitudinal cross sectional view of the first form of roller assembly.

When the tilt ring 36 is normal to axis S as shown in FIG. 2, the ninth gear 66 rotates at a maximum rate relative to third gear 31, and power output shaft 72 rotates at a maximum velocity in a positive direction. As the tilt ring 36 is pivoted in either direction towards the shaft 22 the rate of rotation of power transmitting ring gear decreases, as does the rate of ninth gear 66 relative to third gear 31. The rate of rotation of power output shaft 72 in a positive direction decreases. Further pivoting of the tilt ring 36 results in a gradual decrease in the rate of rotation of power output shaft 72 until the latter becomes stationary. Further tilting of the tilt ring results in a slow down in the rate of rotation of ninth gear 66 relative to third gear 31 to the extent that the power output shaft starts to rotate in a negative direction, and this rate of rotation increasing as the tilt ring is pivoted towards shaft 22. The tilt ring 36, as will be evident from an inspection of FIG. 2 cannot be pivoted ninety degrees from the normal positions, as the tilt ring contacts the shaft 22 prior to this position being reached. The reverse sequence of events takes place as the tilt ring is tilted towards the position shown in FIG. 2 where it is normal to axis 22. The force exerted by the springs 105 on rollers 104 may be varied by rotating the screws 88 when the tilt ring 36 and force transmitting ring 39 are positioned as shown in FIG. 14.

A first alternate form of roller assembly K-1 is shown in FIGS. 6 and 7, together with a first alternate form of force transmitting ring 239 on which the roller assemblies are mounted. Force transmitting ring 239 includes a circumferentially extending web 274 from which a pair of laterally spaced flanges 276 extend inwardly. Ring 239 is rotatably supported in tilt ring 36 in the same manner as force transmitting ring 39. A number of circumferentially spaced legs 278 extend inwardly from web 274 and cooperate with the flanges 276 to define a number of confined spaces 280, as shown in FIG. 6.

Each confined space 280 has a shaft 282 extending transversely thereacross, which shaft has the end portions supported in bores 284 in flanges 276.

A yoke 284 is pivotally supported on each of the shafts 282 as may be seen in FIG. 6. Each yoke 284 includes a pair of legs 284a that have semi-circular recesses 284b extending upwardly from the lower ends thereof. Each yoke 284 has a roller mount 286 associated therewith.

In FIG. 6 it will be seen that each roller mount 286 includes a generally rectangular frame 286a from which a pair of laterally spaced semi-circular side walls 286a extend. Two axially aligned stub shafts 288 extend outwardly from frame 286a and are journaled in recesses 284b as shown in FIG. 6. Each pair of said walls 286b support a pair of radial bearings 290, one of which is shown in FIG. 7. Each pair of radial bearings 290 is rotatably engaged by a pair of hubs 292 that extend outwardly from a roller 294 that is in frictional contact with the sphere 34. Each yoke 284 has a compressed helical spring 296 extending between it and one of the legs 278 that at all times tends to maintain the roller 294 associated with that yoke in pressure contact with the sphere 34. The pressure line 298 shown in FIG. 6 extends through the centers of shaft 282, hub 288, and circumferential surface 294a of roller 294, which circumferential surface is preferably concave, with the radius of curvature thereof being substantially the same as the exterior surface of sphere 34.

If the sphere 34 is assumed to rotate in a clockwise direction as viewed in FIG. 6, the compression on spring 296 will tend to pivot yoke 284 in a counter clockwise direction as viewed in the same figure. Each yoke 284 cannot pivot counter clockwise beyond the pressure line 298 due to the concave surface 294a of the roller 294 associated with the yoke being forced into frictional pressure contact with the surface of sphere 34.

The purpose of the first alternate form of roller mount K-1 is to prevent a small change in the angulation of pressure line 298 from causing increase in pressure on one circumferential edge of roller 294 against sphere 34 with a decrease in pressure by the opposite edge. Variations in pressure contact of the two circumferential edges would increase slippage between the roller and sphere and excessive wear of the roller. The side wall 286b that is subjected to pressure contact by roller 294 in each roller mount K-1 preferably supports a thrust bearing 300 as shown in FIG. 6. The roller mounts K-1 serve to transmit rotary motion of the sphere 34 to force transmitting ring 239, and then through the ring gear 46 attached to the force transmitting ring to the power output shaft 72 in the manner previously described.

A second alternate form K-2 of roller mount is shown in FIG. 8 that may be pivotally supported from a shaft 282 of a power transmitting ring 239. The roller mount K-2 includes a pair of laterally spaced legs 400 that are connected by a web 402 that has an off centered transverse bore 404 therein that pivotally engages shaft 282. The roller mount K-2 includes a roller 406 that has hubs 406a extending outwardly in opposite directions therefrom that rotatably engage radial bearings 408 supported in the legs 400. The pair of legs 400 support radial thrust bearings 412 that may be pressure contacted by roller 406.

The roller 406 is in frictional contact with the surface of sphere 34. If the sphere 34 is assumed to rotate in a clockwise direction as viewed in FIG. 8, the roller mount K-2 will tend to pivot in a counter clockwise direction on shaft 282 due to toggle action, with the pressure line 410 being through the center of shaft 282 and the circumferential surface 406a of roller 406. The roller mount K-2 preferably has thrust bearings 412 supported in the legs 400 that may be pressure contacted by roller 406. The roller mounts K-2 serve the same function as the roller mounts K-1. Both the rollers 294 and 406 are preferably formed from a resilient material having a high coefficient of friction when in pressure contact with a hard surface.

A third form K-3 of roller mount is shown in FIGS. 9, 10, 11 and 12 that is adapted for use with a power transmitting ring 500 that is rotatably supported in tilt ring 36 in the same manner as power transmitting ring 39. Ring 500 has power transmitting ring gear 46 secured thereto, and on the interior has a number of circumferentially spaced transverse grooves 502 formed therein.

Figure 11:
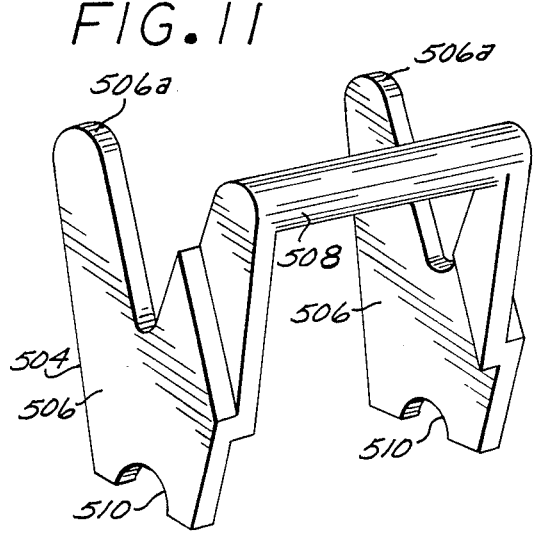
FIG. 11 is a perspective view of a portion of the fourth form of the roller assembly.

Each roller mount K-3 includes a yoke 504 best seen in FIG. 11 that includes a pair of V-shaped, parallel, laterally spaced side piesces 506 that have free semi-circular ends 506a that pivotally engage one of the grooves 502, and a cross bar 508 that is inset from the ends 506a that pivotally engages an adjacently disposed groove. Due to this construction the yokes 504 may be disposed in a circumferential sequence within the force transmitting ring 500, with each groove 502 being engaged by a pair of ends 506a and a cross bar 508. Each yoke 504 has a pair of transverse axially aligned grooves 510 of semi-circular shape formed in the side pieces 506 as shown in FIG. 11.

Figure 12:
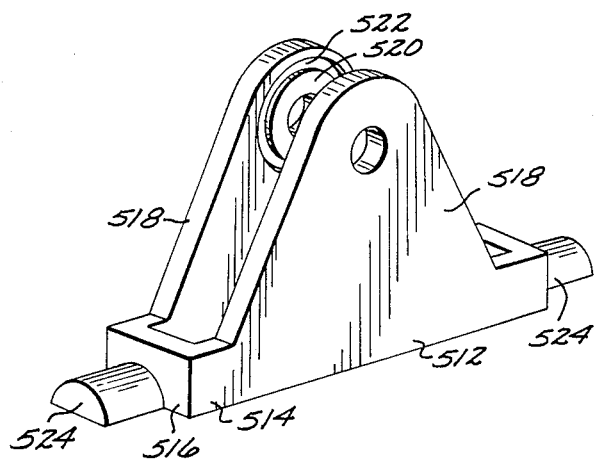
FIG. 12 is a perspective view of another portion of the fourth form of roller assembly.

Each roller mount K-3 also includes a carriage 512 as may be seen in FIG. 12 that is defined by a rectangular frame that has sides 514 and ends 516. Sides 514 have a pair of parallel side plates 518 extending therefrom that support a pair of radial bearings 520 and thrust bearings 522. The ends 516 have a pair of stub shafts 524 projecting therefrom that pivotally engage grooves 510.

The radial bearings 520 rotatably support a pair of hubs 524 that extend outwardly from a roller 526. The roller 526 is rotatably supported within carriage 512 and extends downwardly therebelow as shown in FIG. 9 to frictionally contact the surface of sphere 34.

The position of one of the roller mounts K-3 within the force transmitting ring 500 is shown in FIG. 9. Due to the structure of the roller mount K-3 the pressure line 522 will be through the center of the circumferential surface 526a of roller 526 and cross bar 508 when the sphere 34 rotates in a clockwise direction as viewed in FIG. 9, and the pressure line 530 will be through the ends 506a when the sphere 34 rotates in the opposite direction. The third form of roller mounts K-3 by toggle action maintains all of the rollers 526 in frictional contact with sphere 34 with the same degree of pressure. The third form K-3 of roller mount serves the same function as the roller mounts K.

The use and operation of the transmission T has been explained previously in detail and need not be repeated.

What is claimed is:

1. In a transmission having a housing and a power input and power output shaft extending thereinto, the improvement for selectively regulating the rate and direction of rotation of said power output shaft relative to said power input shaft, said improvement comprising;
   a. a rigid sphere;
   b. first means for rotatably supporting said sphere within said housing to rotate on a first axis;
   c. second means for transferring rotating motion of said power input shaft to said sphere;
   d. a tilt ring that encircles said sphere;
   e. third means for selectively pivoting said tilt ring on a second axis is normal to said first axis;
   f. a ring gear;
   g. fourth means rotatably supported in said ring for frictionally engaging said sphere to be rotated by the latter, said fourth means including;
      1. a force transmitting ring rotatably supported in said tilt ring that has said ring gear rigidly secured thereto;
      2. a plurality of equally spaced rollers that extend in a great circle about said sphere, each of said rollers formed from a material that has a substantial coeffecient of friction when in contact with said sphere; and
      3. mounting means for rotatably supporting said equally spaced rollers from said force transmitting ring in pressure contact with said sphere, with the axis of rotation of said rollers parallel to a plane that extends circumferentially through said force transmitting ring, said mounting means by toggle action subjecting all of said rollers to the same degree of pressure contact with said sphere when the latter rotates;
   h. a differential that includes first and second power input gears, a cross bar connected to said power output shaft; a pair of idling rollers rotatably supported on said cross bar and in toothed engagement with said first and second power input gears, said first power input gear connected to said power input shaft;
   i. gear means for transferring rotarty motion of said ring gear to said second power input gear, with the rate of rotation of said power output shaft sequentially decreasing, becoming stationary and then reversing relative to said power input shaft as said tilt ring is selectively pivoted towards said first axis by said third means.

2. An improved transmission as defined in claim 1 in which said mounting means are a plurality of toggle mechanisms mounted on said power transmitting ring that rotatably support said rollers in contact with said sphere and that subject all of said rollers to the same degree of pressure contact with said sphere when the latter rotates.

3. An improved transmission as defined in claim 1 in which said gear means includes:
   j. first and second connected pinions rotatably supported on an axis parallel to said second axis, said first pinion in toothed engagement with said ring gear; and
   k. a plurality of rotatably supported tooth engaging gears that are in engagement with said second pinion and second power input gear.

4. An improved transmission as defined in claim 1 in which said force transmitting ring is of channel shape transverse cross section and includes two laterally spaced parallel side flanges, and in which said mounting means includes:

k. a plurality of circumferentially spaced shafts that extend transversely between said side flanges;

l. a plurality of yokes pivotally supported from said plurality of shafts;

m. a plurality of carriages pivotally supported from said yokes; and n. a plurality of rollers rotatably supported from said carriages with the axis of rotation of said rollers substantially normal to said shafts, with said plurality yokes, carriages and rollers of such dimensions that said yokes tend to pivot in the direction of rotation of said sphere when the latter rotates and in so doing forcing said rollers into equal pressure contact with said sphere.

5. An improved transmission as defined in claim 1 which said ring gear is rigidly secured to said force transmitting ring.

6. An improved transmission as defined in claim 1 in which said force transmitting ring has an inner circumferential surface on which a plurality of circumferentially spaced transverse grooves are defined and in which said mounting means includes:

m. a plurality of yoke means disposed in circumferential sequence within said force transmitting ring, each of said yoke means engaging a pair of said grooves;

n. a plurality of carriages that pivotally engage said yoke means;

o. fifth means for rotatably supporting said rollers within said carriages, with portions of said rollers projecting inwardly from said carriages, said rollers rotating on axis substantially normal, to said groove and said yoke means, carriages and rollers of such dimensions that said yoke means tend to pivot in said grooves in the direction of rotation of said sphere to force said rollers into equal pressure frictional contact with said sphere.

7. In a transmission having a housing and a power input and power output shaft extending thereinto, the improvement for selectively regulating the rate and direction of rotation of said power output shaft relative to said power input shaft said improvement comprising;
   a. a rigid sphere;
   b. first means for rotatably supporting said sphere within said housing to rotate on a first axis;
   c. second means for transferring rotating motion of said power input shaft to said sphere;
   d. tilt ring that encircles said sphere
   e. third means for selectively pivoting said tilt ring on a second axis normal to said first axis;
   f. a ring gear;
   g. fourth means rotatably supported in said ring for frictionally engaging said sphere to be rotated by the latter, said fourth means including;
      1. a force transmitting ring rotatably supported in said tilt ring that has said ring gear rigidly secured thereto, said force transmitting ring is of channel shape transverse cross section and defined by a web from which a pair of side flanges extend, said web having a plurality of circumferentially spaced transverse tapped openings therein;
      2. a plurality of equally spaced rollers that extend in a great circle about said sphere, each of said rollers formed from a material that has a substantial coefficent of friction when in contact with said sphere, and
      3. mounting means for rotatably supporting said equally spaced rollers from said force transmitting ring in pressure contact with said sphere, said mounting means including a plurality of assemblies for each of said rollers, said assemblies including;
         a. a plurality of sets of thrust receiving elongate members, each of said sets including two pairs of said members that engage transversely aligned openings in said pair of side flanges disposed on opposite sides of one of said tapped bores;
         b. a plurality of roller mounts, each of said roller mounts including an outer portion disposed between two pairs of said thrust receiving members, and an inner portion that includes two laterally spaced legs between which one of said rollers is situated;
         c. a plurality of shafts that extend through transversely aligned openings in said plurality of pairs of legs to rotatably support said rollers;
         d. a plurality of helical springs disposed between said pair of side flanges and in contact with said outer portions of said roller mounts;
         e. a plurality of pressure plates in contact with said springs; and
         f. a plurality of screws that engage said tapped bores and have inner ends to which said pressure plates are secured, with said force transmitting ring when rotated to a position where said tapped bores are radially aligned with transverse openings in said tilt ring permitting said screws to be engaged by a screw driver and be rotated to move said pressure plates radially to vary the force said springs exert on said roller mounts and the magnitude of the pressure contact of said rollers with said sphere;
   h. a differential that includes first and second power input gears, a cross bar connected to said power output shaft, a pair of idling rollers rotatably supported on said cross bar and in toothed engagement with said first and second power input gears, said first power input gear connected to said power input shaft;
   i. gear means for transferring rotary motion of said ring gear to said second power input gear, with the rate of rotation of said power output shaft sequentially decreasing, becoming stationary, and then reversing relative to said power input shaft as said tilt ring is selectively pivoted inwards towards said first axis by said third means.

8. In a transmission having a housing and a power input and power output shfat extending thereinto, the improvement for selectively regulating the rate and direction of rotation of said power output shaft relative to said power input shaft, said improvement comprising;
   a. a rigid sphere;
   b. first means for rotatably supporting said sphere within said housing to rotate on a first axis;
   c. second means for transferring rotating motion of said power input shaft to said second sphere;
   d. a tilt ring that encircles said sphere;
   e. third means for selectively pivoting said tilt ring on a second axis normal to said first axis;
   f. a ring gear;

g. fourth means rotatably supported in said tilt ring for frictionally engaging said sphere to be rotated by the latter, said fourth means including;
   1. a force transmitting ring rotatably supported in said tilt ring that has said ring gear rigidly secured thereto, said force transmitting ring of channel shape transverse cross section and includes two laterally spaced parallel side flanges;
   2. a plurality of circumferentially shafts that extend transversely between said side flanges;
   3. a plurality of yokes pivotally supported from said shafts and extending inwardly therefrom;
   4. a plurality of rollers rotatably supported by said shafts, with the axis of rotation of said rollers substantially normal to said shafts, with each of said yokes and the rollers associated therewith of such demensions that said yokes tend to pivot in the direction of rotation of said sphere as the latter rotates due to frictional contact of said rollers with said sphere, and each of said rollers and yoke associated thertewith transferring an equal amount of rotational force from said sphere to said force transmitting ring;
h. a differential that includes first and second power input gears, a cross bar connected to said power output shaft; a pair of idling rollers rotatably supported on said cross bar and in toothed engagement with said first and second power input gears, said first power input gear connected to said power input shaft, and;
i. gear means for transferring rotary motion of said ring gear to said second power input gear, with the rate of rotation of said power output shaft sequentially decreasing, becoming stationary, and then reversing relative to said power input shaft as said tilt ring is selectively pivoted towards said first axis by said third means.

9. An improved transmission as defined in claim 8 in which said plurality of rollers have flat side surfaces and which in addition includes:
   J. fifth means for transferring thrust from said side surfaces of said plurality of rollers to said plurality of yokes.

10. An improved transmission as defined in claim 9 which in addition includes:
   K. spring means that at all times tend to pivot said plurality of yokes in the same direction as that in which said sphere rotates.

11. An improved transmission as defined in claim 9 in which each of said rollers is of a resilient material and substantial width and has a concave circumferential surface that conforms generally to that of said sphere when in pressure contact therewith.

12. In a transmission having a housing and a power input and power output shaft extending therethrough, the improvement for varying the rate of rotation of said power output shaft relative to that of said input shaft, said improvement including;
   a. a rigid sphere rotatably supported to rotate on a first axis within said housing;
   b. first means for transferring rotary motion from said power input shaft to said sphere;
   c. tilt ring in said housing that extends in a great circle circumferentially about said sphere;
   d. second means that pivotally support said tilt ring to selectively pivot about a second axis normal to said first axis and extending therethrough;
   e. a plurality of circumferentially spaced rollers within said tilt ring that frictionally engage said sphere and rotate therewith;
   f. a differential that includes first and second driven gears, a cross bar connected to said power output shaft; a pair of idling rollers rotatably supported on said cross bar and in toothed engagement with said first and second driven gears;
   g. third means for transferring rotary motion of said circumferentially spaced rollers to said second driven gear, said rollers rotatably supported by said third means within said tilt ring, said plurality of rollers rotating on axis that are parallel to a plane passing circumferentially through said tilt ring; and
   h. fourth means for transferring rotary motion of said power input shaft to said first driven gear, and with the ratio of rate of rotation of said power output shaft relative to said power input shaft varying in proportion to the angle of the cosine between a first position of said tilt ring when it is normal to said first axis and a second position when it is at angle thereto; and
   g. fifth means for manually adjusting the pressure contact of said rollers with said sphere.

13. In a transmission having a housing and a power input and power output shaft extending therethrough the improvement for varying the rate of rotation of said power output shaft relative to said power input shaft said improvement including;
   a. a rigid sphere rotatably supported to rotate on a first axis within said housing;
   b. first means for transferring rotary motion of said power input shaft to said sphere;
   c. a tilt ring in said housing that extends in a great circle circumferentially about said sphere;
   d. second means for pivotally supporting said tilt ring to selectively pivot about a second axis normal to said first axis and extending therethrough;
   e. a plurlity of circumferentially spaced rollers within said tilt ring that frictionally engage said sphere and rotate therewith;
   f. a differential that includes first and second driven gears, a cross bar connected to said power output shaft; a pair of idling rollers rotatably supported on said cross bar and in toothed engagement with said first and second driven gears;
   g. third means for transferring rotary motion of said circumferentially spaced rollers to said second driven gear, said rollers rotatably supported by said third means within said tilt ring, said plurality of rollers rotating on axis that are parallel to a plane passing circumferentially through said tilt ring;
   h. fourth means for transferring rotary motion of said power input shaft to said first driven gear, and with the ratio of rate of rotation of said power output shaft relative to said power input shaft varying in proportion to the angle of the cosine between a first position of tilt ring when it is normal to said first axis and a second position when it is at an angle thereto; and
   i. toggle action means that increase the pressure contact of said rollers with said sphere as said sphere rotates.

14. A transmission as defined in claim 13 in which said third means includes:
   i. a force transmitting ring rotatably supported in said tilt ring and on which said bodies are mounted;

j. a ring gear secured to said force transmitting ring and parallel thereto;

k. pinion means rotatably supported in said housing that engage said ring gear; and l. gear means rotatably supported in said housing that engage said pinion means and said second driven gear.

15. A method of varying the rate of rotation of a power output shaft relative to a power input shaft by the use of a differential that includes first and second driven gears, a cross bar connected to said power output shaft, a pair of idling rollers rotatably supported on said crossbar, said method including the steps of:

a. concurrently transferring rotating motion of said power input shaft to said first driven gear and to a rigid sphere that rotates on a first axis;

b. disposing a plurality of circumferentially space rigid bodies in a great circle about said sphere and in frictional contact therewith, with the diameter of said great circle defining a second axis normal to said first axis;

c. transferring the rotaty motion of said plurality of bodies to said second driven gear;

d. varying the rate of rotation of said power output shaft relative to said power input shaft by pivoting said plurality of circumferentially spaced bodies about said second axis, with the ratio of rotation of said power output shaft relative to said power input shaft varying in proportion to the cosine of the angle between a first position of said great circle when it is normal to said first axis and a second position where it is at an angle thereto and;

e. increasing the pressure of said bodies on said sphere as the latter rotates.

* * * * *